US010599640B2

(12) United States Patent
Innes et al.

(10) Patent No.: US 10,599,640 B2
(45) Date of Patent: Mar. 24, 2020

(54) PREDICTIVE SEARCH WITH CONTEXT FILTERING

(71) Applicant: AT&T Intellectual Property I, L.P., Atlanta, GA (US)

(72) Inventors: Timothy Innes, Atlanta, GA (US); Eric Zavesky, Austin, TX (US); Nigel Bradley, McDonough, GA (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 266 days.

(21) Appl. No.: 15/846,913

(22) Filed: Dec. 19, 2017

(65) Prior Publication Data

US 2019/0188296 A1 Jun. 20, 2019

(51) Int. Cl.
*G06F 16/242* (2019.01)
*G06F 16/248* (2019.01)
*G06F 16/51* (2019.01)
*G06F 16/9535* (2019.01)
*G06K 9/00* (2006.01)
*G06K 9/20* (2006.01)
*G06K 9/62* (2006.01)
*G06N 20/00* (2019.01)

(52) U.S. Cl.
CPC ........ *G06F 16/2425* (2019.01); *G06F 16/248* (2019.01); *G06F 16/51* (2019.01); *G06F 16/9535* (2019.01); *G06K 9/00885* (2013.01); *G06K 9/209* (2013.01); *G06K 9/6256* (2013.01); *G06N 20/00* (2019.01); *G06K 9/6268* (2013.01); *G06K 2009/00939* (2013.01)

(58) Field of Classification Search
CPC .. G06F 16/2425; G06F 16/9535; G06F 16/51; G06F 16/248; G06N 20/00; G06K 9/209; G06K 9/6256; G06K 9/00885; G06K 9/6268; G06K 2009/00939
See application file for complete search history.

(56) References Cited

U.S. PATENT DOCUMENTS

| 7,856,446 | B2 * | 12/2010 | Brave ................ G06F 16/9535 707/776 |
| 8,020,104 | B2 | 9/2011 | Robarts et al. |
| 8,782,138 | B2 | 7/2014 | Anderson et al. |
| 9,135,303 | B2 | 9/2015 | Stekkelpak |
| 9,171,068 | B2 | 10/2015 | Xu |
| 9,330,162 | B2 | 5/2016 | Moritz et al. |
| 9,779,132 | B1 | 10/2017 | Bauer et al. |
| 9,940,362 | B2 * | 4/2018 | Lim ...................... G06F 16/29 |
| 10,127,321 | B2 * | 11/2018 | Aravamudhan .... G06F 16/9535 |
| 10,217,058 | B2 * | 2/2019 | Gamon ................ G06N 20/00 |

(Continued)

*Primary Examiner* — Jorge A Casanova

(57) ABSTRACT

A method may include a processing system detecting a biometric condition of a user exceeding a threshold, determining a triggering object associated with the biometric condition, where the triggering object is captured via a camera, and applying the triggering object and at least one personal parameter to a plurality of context filters. The plurality of context filters may provide a relevance topic based upon the triggering object and the at least one personal parameter. The processing system may further generate a plurality of search terms based upon the relevance topics that are determined from the plurality of context filters and present the plurality of search terms via a user interface.

20 Claims, 5 Drawing Sheets

(56) References Cited

U.S. PATENT DOCUMENTS

| | | | |
|---|---|---|---|
| 10,423,650 B1* | 9/2019 | Moon | G06F 16/337 |
| 2009/0204677 A1 | 8/2009 | Michaelis et al. | |
| 2010/0088258 A1* | 4/2010 | Oaten | G06N 7/005 |
| | | | 706/13 |
| 2014/0289323 A1* | 9/2014 | Kutaragi | G06Q 50/01 |
| | | | 709/203 |
| 2014/0358882 A1* | 12/2014 | Diab | G06F 16/9535 |
| | | | 707/707 |
| 2015/0324698 A1 | 11/2015 | Karaoguz et al. | |
| 2016/0042069 A1* | 2/2016 | Lee-Goldman | G06F 16/951 |
| | | | 707/706 |
| 2016/0196587 A1* | 7/2016 | Eder | G06Q 30/00 |
| | | | 705/14.49 |
| 2016/0306798 A1* | 10/2016 | Guo | G06F 16/93 |
| 2017/0039283 A1* | 2/2017 | Bennett | G06F 16/335 |
| 2017/0116982 A1* | 4/2017 | Gelfenbeyn | G06F 3/16 |
| 2017/0195731 A1 | 7/2017 | Girlando et al. | |
| 2017/0276506 A1 | 9/2017 | McDunn et al. | |
| 2018/0336200 A1* | 11/2018 | Lim | G06F 16/335 |
| 2018/0349472 A1* | 12/2018 | Kohlschuetter | G06F 16/3322 |

* cited by examiner

PREDICTIVE SEARCH WITH CONTEXT FILTERING

The present disclosure relates generally to search recommendations, and more particularly to devices, computer-readable media, and methods for providing automated search terms via context filtering.

BACKGROUND

At the core of big data applications and services are machine learning models that analyze large volumes of data to deliver various insights, key performance indicators, and other actionable information to the users of the applications and services. Designers may differentiate machine learning models, or machine learning algorithms (MLAs) for different big data applications involving video, speech, text, location information, images, network traffic data, and so forth. For example, different machine learning models (derived from corresponding MLAs) may include support vector machine (SVMs), e.g., binary classifiers and/or linear binary classifiers, multi-class classifiers, kernel-based SVMs, or the like, a distance-based classifier, a decision tree algorithm/model, a k-nearest neighbor (KNN) algorithm/model, and so on.

SUMMARY

In one example, the present disclosure provides a device, computer-readable medium, and method for providing automated search terms via context filtering. For example, a processing system including at least one processor may detect a biometric condition of a user exceeding a threshold, determine a triggering object associated with the biometric condition, where the triggering object is captured via a camera, and apply the triggering object and at least one personal parameter to a plurality of context filters. The plurality of context filters may provide a relevance topic based upon the triggering object and the at least one personal parameter. The processing system may further generate a plurality of search terms based upon the relevance topics that are determined from the plurality of context filters and present the plurality of search terms via a user interface.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
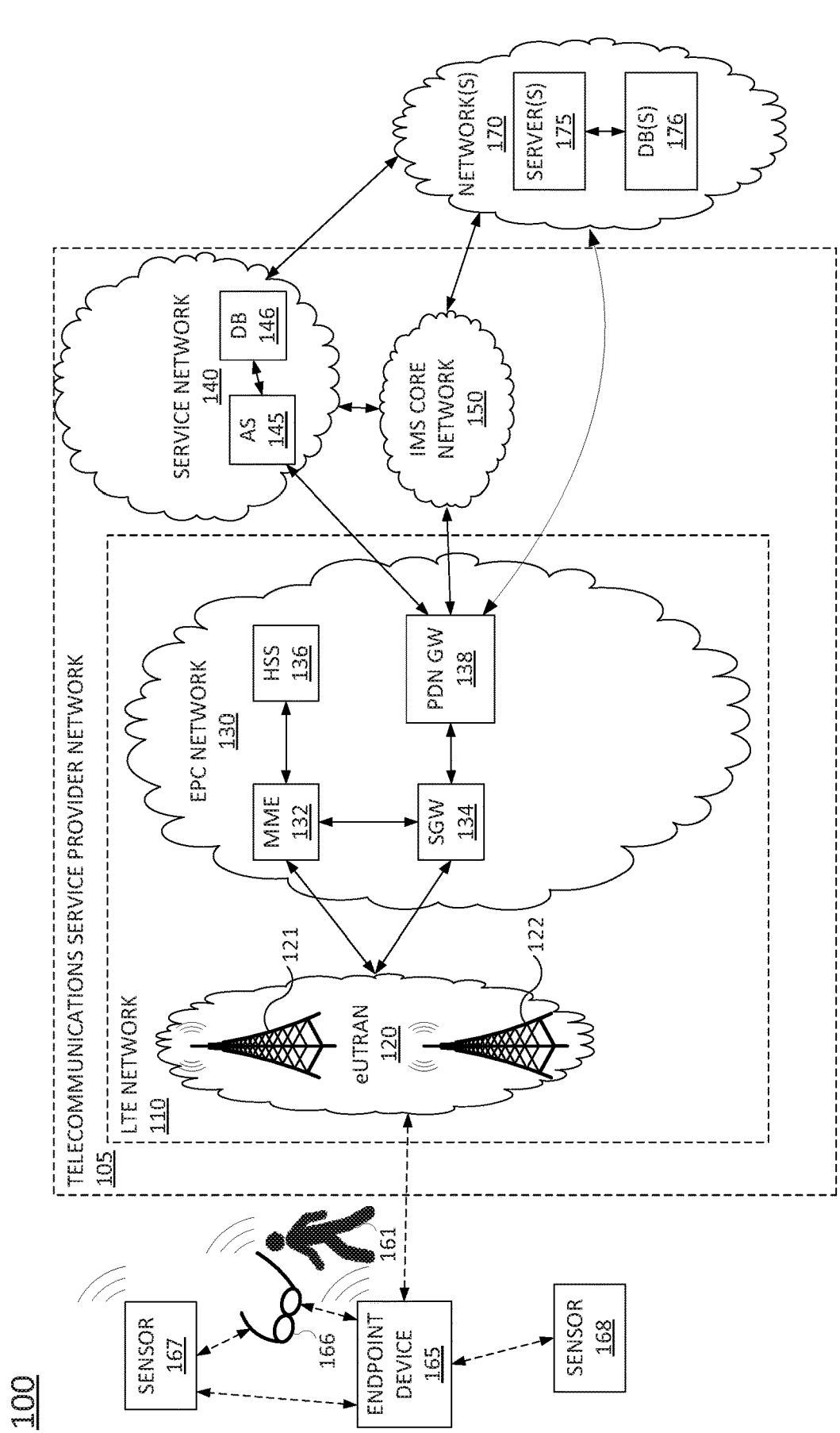
FIG. 1 illustrates one example of a system including a telecommunication service provider network, according to the present disclosure.

The present disclosure broadly discloses devices, non-transitory (i.e., tangible or physical) computer-readable storage media, and methods for providing automated search terms via context filtering. In accordance with the present disclosure, the user's context is used to infer intents relating to triggering objects that may be encountered by a user in an environment and to generate automated query sets, or search terms, that are related to such intents. In one example, a mental model of the user is constructed from a handful (e.g., 3-5, 5-7, etc.) of fundamental perspectives from which the user predominantly views the world at a given time. For example, a particular user at a particular time may have a perspective set that includes "family," "sports," and "politics."

In one example, active perspectives are selected for the user based upon personal parameters such as biographical information (e.g., career, residence, marital status, etc.), calendar information, daily activities, locations, on-line purchases, social media interactions and consumption, recent search queries, and so forth. The system then scans the environment and measures biological conditions of the user to determine trigger items/objects encountered by a user. For each trigger item/object encountered by the user, the system then outputs automated search terms in accordance with a plurality of active context filters, each active context filter associated with one of the perspectives, or "themes." In one example, a possible relevance of an object is determined through the different context filters. In particular, the system determines at least one possible theme from within each context filter category that is invoked by the object, and the automated search terms are generated based upon the possible theme(s). The automated search query terms may be further selected in view of a user's preferences, search history, purchase history, etc.

To illustrate, in one example, a trigger event (e.g., pupil dilation, heart rate increase, etc., broadly a "biometric condition"), or a combination of trigger events, is detected that exceeds a threshold. Next, the system may attempt to connect the trigger event to an immediate reference (e.g., a conversation the user is currently having with someone, an image viewed by the user, a sound detected near the user, etc.). This can involve an image salience determination process, for example. In one example, the output of this step is a particular object or item that is determined to be of a particular interest.

Next, the system attempts to determine the relevance of the item or object, i.e., determining why the item may have significance to the user. In accordance with the present disclosure, the system provides as inputs to this stage: the triggering object/item along with personal parameters which may include: environmental information, user profile information, the user's location, time, date, calendar information, historical information regarding a user's searches, purchases, television viewing history, etc., call and text logs, and so forth. The personal parameters may be determined from sensors deployed in a network and/or carried by the user, from a wearable device, such as smart glasses, a heart rate monitor, a pedometer, etc., and/or another mobile electronic device carried by the user, e.g., a smartphone, from a network-based data repository, e.g., a user profile database, a social media profile, and so forth.

In one example, the inputs may be "cleaned," or normalized, and provided to several different context filters such as "family," "sports," and "politics" to determine what the relevance of the object could be. The context filters may comprise machine learning models (MLMs) that take a large number of inputs and attempt to classify the series of inputs into a determination of a relevant topic. Notably, the different context filters are focused upon different perspectives. For instance, the "family" context filter does not search the entire universe of possibilities as to the relevance of the triggering object, but only those possibilities that are related to the theme of "family." Similarly, the "sports" context filter does not search the entire universe of possibilities as to the relevance of the triggering object, but only those possibilities that are related to the theme of "sports." Thus, for each context filter the universe of possible topics, and hence the execution time of the algorithm is limited.

Each context filter determines a result that is a most likely topic of relevance, or the top "n" most likely topics of relevance based upon the triggering object and the additional inputs regarding the user's location, calendar, recent calls and text, the user profile, etc. Each context filter generates its own output comprising one or more topics that are considered to be most relevant.

Next, based upon these topics, automated search terms are generated and are presented to the user via a user interface. In one example, the user interface is a wheel of options with different clusters, each cluster having the automatically generated search term(s) from a respective context filter. The automated search terms may be further generated in view of a user's preferences, search history, purchase history, etc. In one example, several automatically generated search term recommendations may be generated in connection with each context filter (or topic that is determined via each context filter).

An example of the operations of the present disclosure may be as follows: a user is walking down the street with a wearable device (e.g., smart glasses) and roses in a flower shop window may catch the user's attention. In one example, this is quantified by detecting one or more biometric conditions such as an increased heart rate past a threshold, an increase in blood pressure past a threshold, a pupil dilation past a threshold, etc. In addition, in one example, the one or more biometric conditions may be traced to a triggering object by reviewing images or video frames captured via a camera associated with a user in the recent past, e.g., within the last 5 seconds, within the last 2 seconds, etc., and applying an image salience model. For instance, the image salience model may determine that the roses were the most salient object, thereby identifying the roses as the triggering object. One possible perspective that is activated for the user is a "family" context filter. In addition, calendar information may indicate it is a day before the user's anniversary. From this set of information, the "family" context filter may determine that the most relevant topic is "anniversary." Next, one or more search terms may be automatically generated based upon these determinations. For instance, in this case, search query term recommendation may be "anniversary gift ideas" or "where to buy flowers."

A similar process may be performed in parallel with regard to other context filters. Although the triggering object of flowers may be less likely to invoke the user's active perspective of "sports," the context filters associated with "sports" may nevertheless attempt to determine a most applicable topic and then generate automated search terms based upon the topic and the triggering object (i.e., flowers). The automated search terms generated regarding the perspective of "family" may then be presented via a user interface along with other options generated with respect to the context filters of other perspectives for possible selection by the user. These and other aspects of the present disclosure are discussed in greater detail below in connection with the examples of FIGS. 1-5.

FIG. 1 illustrates an example network, or system 100 that may implement or support examples of the present disclosure for providing automated search terms via context filtering. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices, e.g., servers 175 in networks 170, with other endpoint devices (not shown) and/or with other components of telecommunication service provider network 105.

As illustrated in FIG. 1, endpoint device 165 and/or endpoint device 166 may be associated with user 161. Endpoint device 165 may comprise, for example, a cellular telephone, a smartphone, a tablet computing device, a laptop computer, a wireless enabled wristwatch, or any other wireless and/or cellular-capable mobile telephony and computing device (broadly, a "mobile endpoint device"). Endpoint device 166 may comprise, for example, a wearable computing device, such as a head-mounted smart camera, a pair of smart glasses, smart earbuds, and so forth. In one example, endpoint device 166 may be equipped for non-cellular wireless communication. In another example, endpoint device 166 may be equipped for cellular and non-cellular wireless communication. In one example, endpoint device 165 and endpoint device 166 may include components which support peer-to-peer and/or short range wireless communications. Thus, each of the mobile endpoint devices 165 and 166 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

Mobile endpoint devices 165 and 166 may be equipped with display screens, speakers, headsets, and the like for displaying and/or presenting communications, and for receiving inputs for interacting with such communications. In addition, endpoint device 165 and/or 166 may be equipped with one or more cameras for capturing images (including still images and/or video) from an environment. For instance, endpoint device 166 may comprise smart glasses with an outward facing camera to capture images from a field of view in a direction that a user is looking. In accordance with the present disclosure, such images may include triggering items/objects that may be of interest to a user. In one example, endpoint device 165 and/or endpoint device 166 may include additional components for capturing data from an environment, such as an acoustic sensor (or microphone), an additional camera (e.g., an inward facing camera for capturing facial expressions, pupil dilation, and so on), a temperature sensor (e.g., a thermometer), a Global Positioning System (GPS) unit, an electroencephalography (EEG) unit for measuring electrical activity of the brain, a diffuse optical tomography (DOT) scanning device for measuring brain activity, and so on (broadly "sensor devices"). In addition, in one example, mobile endpoint devices 165 and 166 may comprise all or a portion of a computing device or system, such as computing system 500, and/or processing system 502 as described in connection with FIG. 5 below, specifically configured to perform various steps, functions, and/or operations for providing automated search terms via context filtering, in accordance with the present disclosure.

As illustrated in FIG. 1, endpoint device 165 and/or endpoint device 166 may be in communication with one or more additional sensor devices 167 and/or 168, each of which may comprise, for example, a heart rate monitor, an electrocardiogram (ECG) device, a pedometer, a galvanic skin response (GSR) device, an additional microphone, a haptic sensor or haptic feedback device, and so forth. Such one or more additional sensor devices 167 and/or 168 may also be equipped with transceivers, e.g., for cellular communications and/or for non-cellular wireless communications, such as for IEEE 802.11 based communications, IEEE 802.15 based communications, and so forth. Each of these sensor devices may be used to measure various biometric conditions of the user 161, such as: a heartrate, a blood pressure, a breathing rate, a blood oxygen concentration, a facial expression, a pupil dilation, a voice pitch, a voice tone, an activity level, a skin conductance, a body temperature, an ECG pattern, and so on.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed. In the example of FIG. 1, service network 140 may include an application server (AS) 145. In one example, AS 145 may comprise all or a portion of a computing device or system, such as computing system 500, and/or processing system 502 as described in connection with FIG. 5 below, specifically configured to perform various steps, functions, and/or operations for providing automated search terms via context filtering, in accordance with the present disclosure. In one example, service network 140 may also include a database (DB) 146, e.g., a physical storage device integrated with AS 145 (e.g., a database server), or attached or coupled to the AS 145, to store various types of information in support of systems for providing automated search terms via context filtering, in accordance with the present disclosure.

Figure 5:
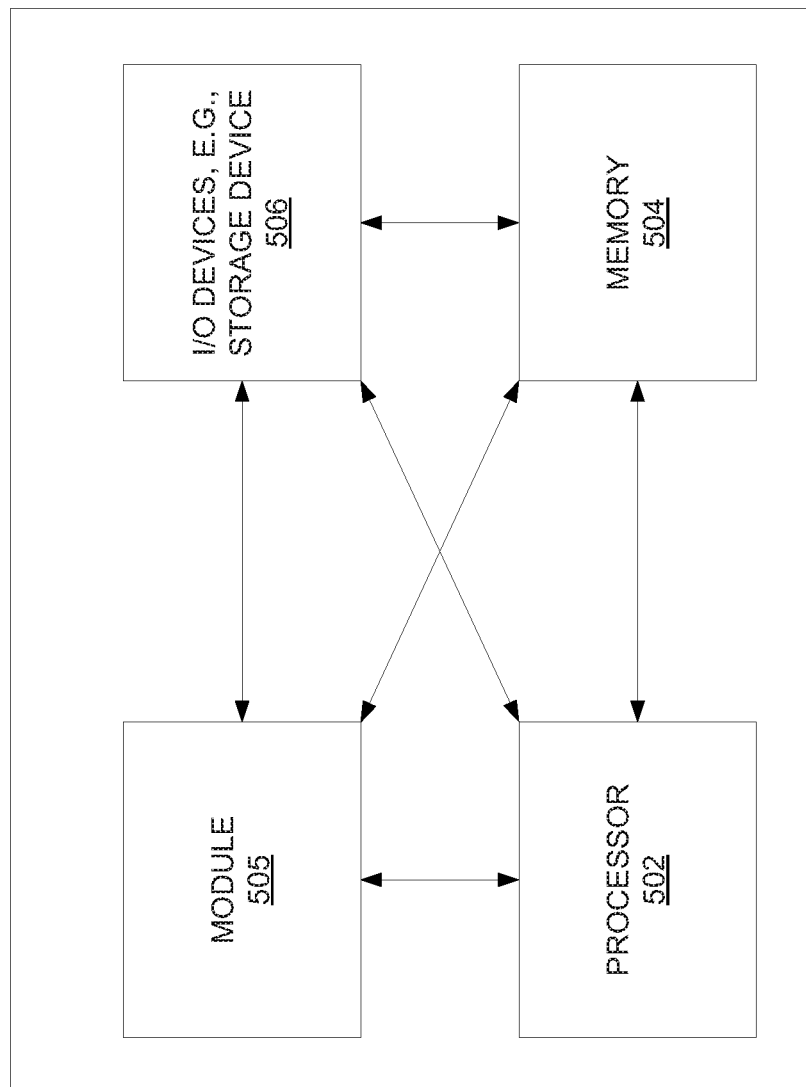
FIG. 5 illustrates a high-level block diagram of a computing device specially programmed to perform the functions described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. As illustrated in FIG. 1, networks 170 include one or more servers 175 which may each comprise all or a portion of a computing device or system, such as computing system 500, and/or processing system 502 as described in connection with FIG. 5 below, specifically configured to perform various steps, functions, and/or operations for providing automated search terms via context filtering, in accordance with the present disclosure. In one example, networks 170 may also include one or more databases (DBs) 176, e.g., physical storage devices integrated with server(s) 175 (e.g., a database server), or attached or coupled to the server(s) 175, to store various types of information in support of systems for providing automated search terms via context filtering, in accordance with the present disclosure.

In one example, endpoint devices 165 and 166 may be connected to the one or more servers 175 via PDN GW 138, and/or via PDN GW 138 and IMS core network 150. In this regard, it should be noted that various functions that may be performed by AS 145 may alternatively or additionally be performed by the one or more of servers 175, and vice versa.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 111 and 112, PDN GW 138, AS 145, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, AS 145, DB 146, servers 175 and/or DBs 176 may comprise cloud-based and/or distributed data storage and/or processing systems comprising one or more servers at a same location or at different locations. However, for ease of illustration, these components are depicted as standalone devices in FIG. 1. In addition, although the AS 145 and DB 146 are illustrated as components of service network 140, in other examples, any one or more of these components may be deployed in a different configuration, such as in LTE network 110, IMS network 150, and so forth. Thus, these and other modifications are all contemplated within the scope of the present disclosure.

Figure 2:
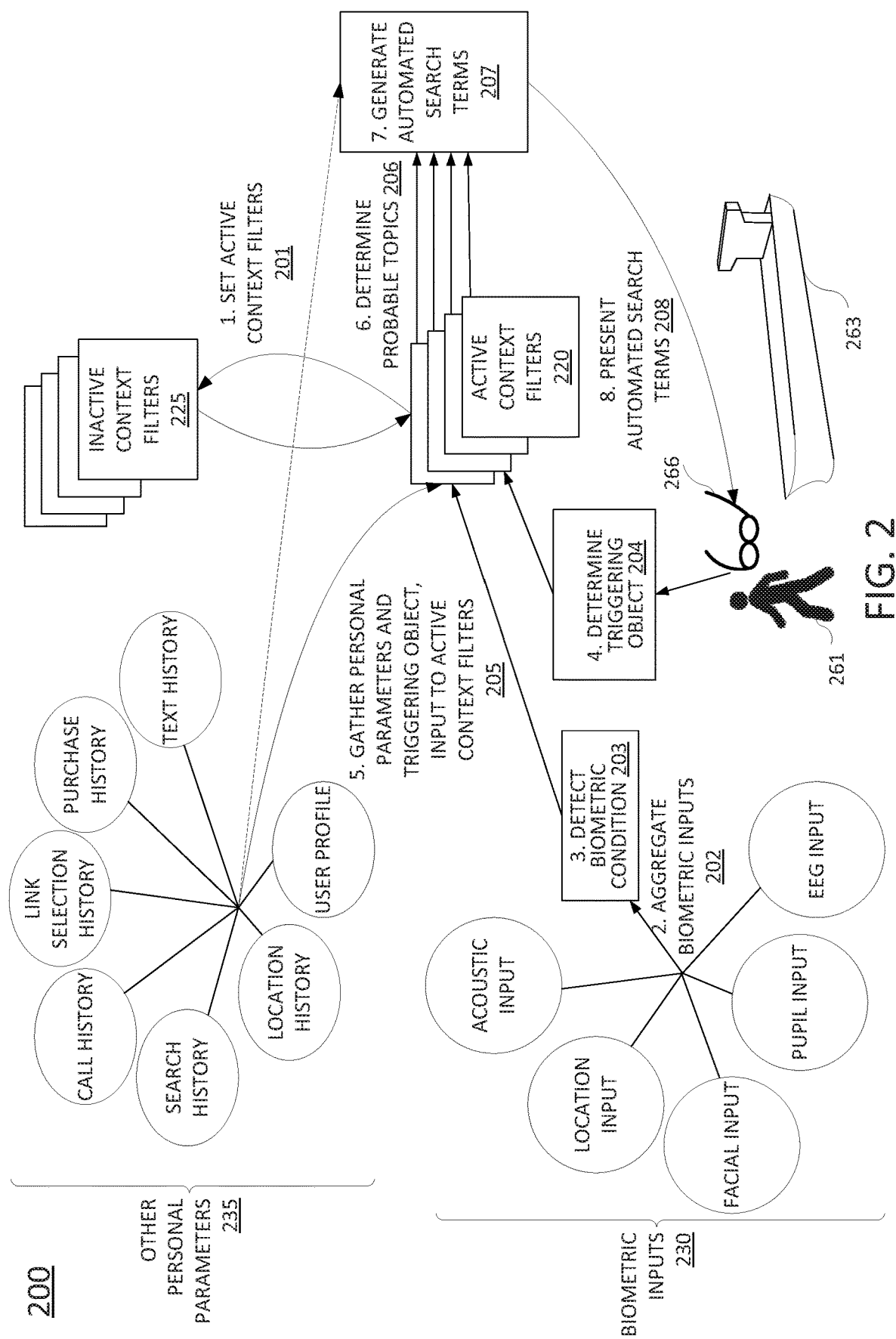
FIG. 2 illustrates a pictorial representation of an example process for providing automated search terms via context filtering, in accordance with the present disclosure.

To aid in understanding the present disclosure, FIG. 2 illustrates a pictorial representation of an example process 200 for providing automated search terms via context filtering, in accordance with the present disclosure. In the example of FIG. 2, the process 200 includes a series of steps 201-208. In the first step 201, active context filters 220 associated with user 261 are selected. In the present example, the active context filters 220 may be associated with the themes, or perspectives of: "vacation," "environment," and "finances." There may be other context filters available for the user 261 that are associated with other themes/perspectives such as "work," "sports," "family," "shopping," "finance," "charity," "relationship," "food," "entertainment," etc. represented by inactive context filters 225 in FIG. 2. These inactive context filters 225 may be used at other times when the associated themes/perspectives may dominate the attention of user 261. In one example, the user 261 may explicitly indicate or select active context filters 220. In another example, active context filters 220 may be selected based upon a time of day and/or day of week, a location, and so forth. In one example, active context filters 220 may be automatically selected based upon various parameters. User 261 may then accept or change the automatically selected active context filters. In such an example, the automated selection of active context filters 220 may then be updated based upon the input from user 261. For instance, the selection of active context filters 220 may comprise a machine learning model that is trained and subsequently updated based upon manual selection of active context filters 220 by user 261.

In the second step 202, biometric inputs 230 associated with user 261 are aggregated. The biometric inputs 230 may include data from various biometric sensors, such as an acoustic sensor, an inward facing camera, a temperature sensor, a GPS unit, an EEG unit, a DOT scanning device, and so forth. In one example, the aggregation may include data normalization, sampling, averaging, and so forth. In one example, the aggregation may also include eliminating redundant data in view of the active context filters 220. For instance, in one example, different context filters may utilize different data sets for their respective functions. In the third step 203, a biometric condition of user 261 is detected. The biometric condition may be based upon any one or more of biometric inputs 230. The biometric condition may be related to one or more mental states of surprise, anger, curiosity, excitement, interest, fear, or the like. For instance, the biometric condition may comprise a facial expression, an elevated heart rate, or a steep increase in blood pressure, a heightened skin conductance, and so forth. It should be noted that pupil dilation can be indicative of emotion. In addition, the direction of a user's gaze may provide clues as to visual or audible curiosity. Similarly, facial movement patterns can indicate emotions such as curiosity, confusion, and so forth. In one example, the biometric condition of user 261 may comprise a combination of biometric inputs 230 exceeding respective thresholds, or exceeding a threshold as determined by a weighted formula accounting for multiple biometric inputs 230. In one example, the mental state of the user may be calculated from the biometric inputs 230. In another example, the actual mental state of the user need not be determined. Rather, it may be sufficient to detect that such one or more biometric inputs have exceeded a threshold.

In the fourth step 204 a triggering object is determined. In one example, an image or series of images (e.g., a short video snippet of 1-5 seconds) captured via a wearable device 266 (e.g., with a camera) is processed to determine the triggering object. In one example, the triggering object may be detected by performing an image salience detection processes, (e.g., applying an image salience model) and then performing an image recognition algorithm over the "salient" portion of the image(s). In the present example, the triggering object may be determined to be a ship or a boat 263.

In the fifth step 205, process 200 may include gathering an identification of the triggering object 263 and personal parameters as inputs for the active context filters 220. The personal parameters may include one or more of biometric inputs 230. The personal parameters may alternatively or additionally include one or more of other personal parameters 235, such as prior purchases, searches, calls, and/or text histories, user profile information, and so forth. In one example, the personal parameters may be selected in accordance with the active context filters 220. For instance, in one example, different context filters may utilize different data sets for their respective functions.

In the sixth step 206, probable topics invoked by the triggering object may be output by the active context filters 220. For instance, each of the active context filters 220 may comprise a machine learning model (MLM) that takes a large number of inputs and attempts to classify the series of inputs into a determination of a relevant topic (or several most relevant topics). In one example, different context filters for different themes can utilize different inputs. In another example, they may all use the same set of inputs. The weights/significance attached to each input may vary from one context filter to the next.

The context filters may be trained with training data associated with the user, a plurality of other users, or both. In one example, the context filters may be initialized based upon generic user profiles and then retrained and evolved to match the behaviors and preferences of user 261. In accordance with the present disclosure, each of the context filters is specific to a different theme of a plurality of themes. In addition, each of the plurality of themes is associated with a respective set of (possible) topics which are related to the theme. For example, a theme of "family" may have the topics of "children," "partner," "birthdays," "anniversaries," and so forth. Similarly, the theme of "sports" may have the topics of "watching baseball," "playing baseball," "watching basketball," "playing basketball," etc. In another example, a theme of "vacation" may have the topics of "flights," "hotels," "beach," "mountains," "cruise," "Europe," "lodging," etc. In one example, each theme may have from 10-100 topics or more from which the context filter may attempt to determine a relevant topic.

In general, a system for generating a predictive model (a machine learning model) may collect, aggregate, and/or store various types of data that may be used as training data and which may be processed via the machine learning models. In accordance with the present disclosure, a context filter (a machine learning model) may be created (trained) for a given theme based upon example triggering objects and personal parameters that may be collected in connection with the user 261 and/or a plurality of other users, e.g., who may have similar profiles to user 261. Once trained, the context filter may be applied to new data that is collected (e.g., a triggering object and one or more personal parameters) to generate an inference (e.g., one or more relevant topics).

A machine learning model, such as a context filter, may be generated from the training data set in a variety of ways. For instance, the purpose of a machine learning algorithm (MLA) may be to generate a machine learning model, such as a SVM-based classifier, e.g., a binary classifier and/or a linear binary classifier, a multi-class classifier, a kernel-based SVM, etc., a distance-based classifier, e.g., a Euclidean distance-based classifier, or the like, or a non-classifier type machine learning model, such as a decision tree, a KNN predictive model, a neural network, and so forth. For illustrative purposes, examples of the present disclosure are described herein primarily in connection with classifier type MLAs/machine learning models. In one example, the training data set may include labeled data which may be used in training the machine learning model to discriminate positive examples from negative examples. In another example where the classifier comprises a SVM, the machine learning algorithm may calculate a hyper-plane in a hyper-dimensional space representing the features space of all possible triggering objects and personal parameters. The hyper-plane may define a boundary in the feature space which separates positive examples from negative examples. Once a classifier, or other type of machine learning model/predictive model, is generated for a particular network service and for a particular theme, the classifier may be applied to new data.

For instance, a stream of new data may be translated into a vector in the feature space, and the classifier may be used to determine on which "side" of the hyper-plane the vector lies. As such, the classifier may determine whether the stream of new data is a positive or a negative example. In one example, a confidence score may be calculated and provided along with the classification. For instance, a distance between the vector representing a current triggering object and personal parameter(s) and the hyperplane may be calculated. Thereafter, the confidence score may be calculated from the distance. For example, the confidence score may be proportional to the distance. The greater the distance, the higher the confidence score. In one example, the relationship between the distance and the confidence score may be empirically set.

It should be noted that examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth. For example, a decision tree algorithm may be used instead of SVM-based binary classifiers. In another example, a binary KNN algorithm may be utilized. In still another example, a distance-based classifier may be used. For example, the machine learning algorithm may comprise a clustering algorithm over positive examples to generate a vector in a hyper-dimensional space representing the average of the positive examples. In addition, it should be noted that other aspects of the present disclosure may also involve machine learning algorithms and machine learning models of the types discussed above. For instance, image salience and/or image recognition models, auto-complete or auto-suggest algorithms, and so forth, may all comprise MLMs of the same or a similar nature. Thus, these and other modifications are all contemplated within the scope of the present disclosure.

In one illustrative example, each of active context filters 220 may include a plurality of binary or multi-class classifiers, e.g., for one or several possible topics. In such an example, the set of inputs (trigger object and personal parameter(s)) may be applied to each classifier, and the various topics may be scored based upon the results. The output for each of the respective active context filters may be the top one or the top several topics. In general, the active context filters 220 attempt to determine which possible topics within each theme are invoked based upon the triggering object and one or more personal parameters of the user.

In the example of FIG. 2, the user 261 may view ship or boat 263, which is then determined to be a triggering object based upon a biometric condition exceeding a threshold, and based upon the ship or boat 263 being determined the most salient object captured by wearable device 266 within the relevant time frame. One of the active context filters 220 may be related to the theme of "vacation." This particular context filter may receive an identification of ship 263 as being a triggering object, e.g., pertaining to a cruise. In addition, the context filter may receive one or more personal parameters of user 261, which could include a search history, a link selection history (e.g., a web browsing history), a call history, etc. These one or more personal parameters may indicate that the user 261 has recently called a travel agent. The personal parameters may also indicate that the user 261 has recently purchased an underwater camera, navigated to the website of a major cruise line, and so forth. Based upon these various inputs, the context filter may determine that the topic of "cruise," is the highest rated topic, which may be output at the sixth step 206.

It should be noted that these personal parameters may be processed between a data source and the input to the context filter. For instance, a recent purchase history of user 261 may include a large number of purchases. However, one of the relevant data dimensions may be "has purchased bathing suit in last 60 days." Thus, the purchase history may not be input to the context filter in raw form, but may be pre-processed to create a "yes" or "no" value for this particular data input. In one example, the context filters may be trained upon inputs in a form in which such inputs are available from a data feed. For instance, a credit card company may maintain customer profiles based upon the purchase histories that may include the top 10 categories of user purchases within the last 60 days, the top merchants that the customer has done business within the last 60 days, etc. Similarly, the user location history may be provided in a condensed or summarized form, e.g., the most frequented locations in the last 30 days, the most frequented weekday evening location (e.g., the top 5, top 10, etc.), the locations where the most time has been spent in the last 24 hours, and so forth. Thus, in one example, the personal parameters that are possible inputs to the active context filters 220 may already be stored in useable form.

Similarly, another active context filter may be an "environment" context filter. The environment context filter may receive the identification of "ship" as the triggering object and the same or different personal parameters. This context filter may determine that the most relevant topic is "oil spills." In addition, another active context filter may be a "finance" context filter. The input triggering object remains "ship." The finance context filter may receive the same or a different set of input personal parameters and may determine that the most relevant topic is "oil prices." This may be selected from among other possible topics which could include, "imports," "exports," "retail," and so forth. For instance, the personal parameters may indicate that the user has purchased oil futures indicating a greater likelihood of the topic of interest. However, another user may be more interested in macroeconomic indicators such as import/export metrics, trade deficit, etc. Thus, the image of a ship from a perspective of "finance" may still be different from user to user.

In the seventh step 207, automated search terms are generated based upon the probable topics that are output via the active context filters 220. The automated search terms may be generated based upon the triggering object (ship 263) and the topics output via the active context filters 220. In one example, several automatically generated search term recommendations may be generated in connection with each active context filter 220. In one example, the generating of the plurality of automated search terms comprises, for each relevance topic, selecting auto-complete or auto-suggest terms associated with the relevance topic and the triggering object from a database. In one example, auto-complete or auto-suggest results relating to item may provide a list of resulting search terms which may be scored for relevance to the relevance theme and/or the topic associated with the respective context filter, and the top "n" results returned. The automated search terms may be further generated in view of the preferences, search history, purchase history, etc. of user 261. For instance, previous search terms or previous selections made by user 261 relating to the theme, topic, and/or item (ship 263) may be stored such that the previous search terms can be positively weighted as possible suggestions. Similarly, in another example, automated search terms are generated from search terms and/or link selections made by contacts of user 261 in similar contexts (e.g., when similar perspectives/themes are active for the other users), or from search terms and/or link selections of other users who have similar profiles to the user, and so forth.

In the eighth step 208, the automated search terms are provided back to the wearable device 266 for presentation (e.g., via a display screen, a speaker, a headphone, etc.) and possible selection by user 261 via a user interface. In one example, the display portion of a user interface for presenting a plurality of automated search terms is illustrated in the example of FIG. 3.

Figure 3:
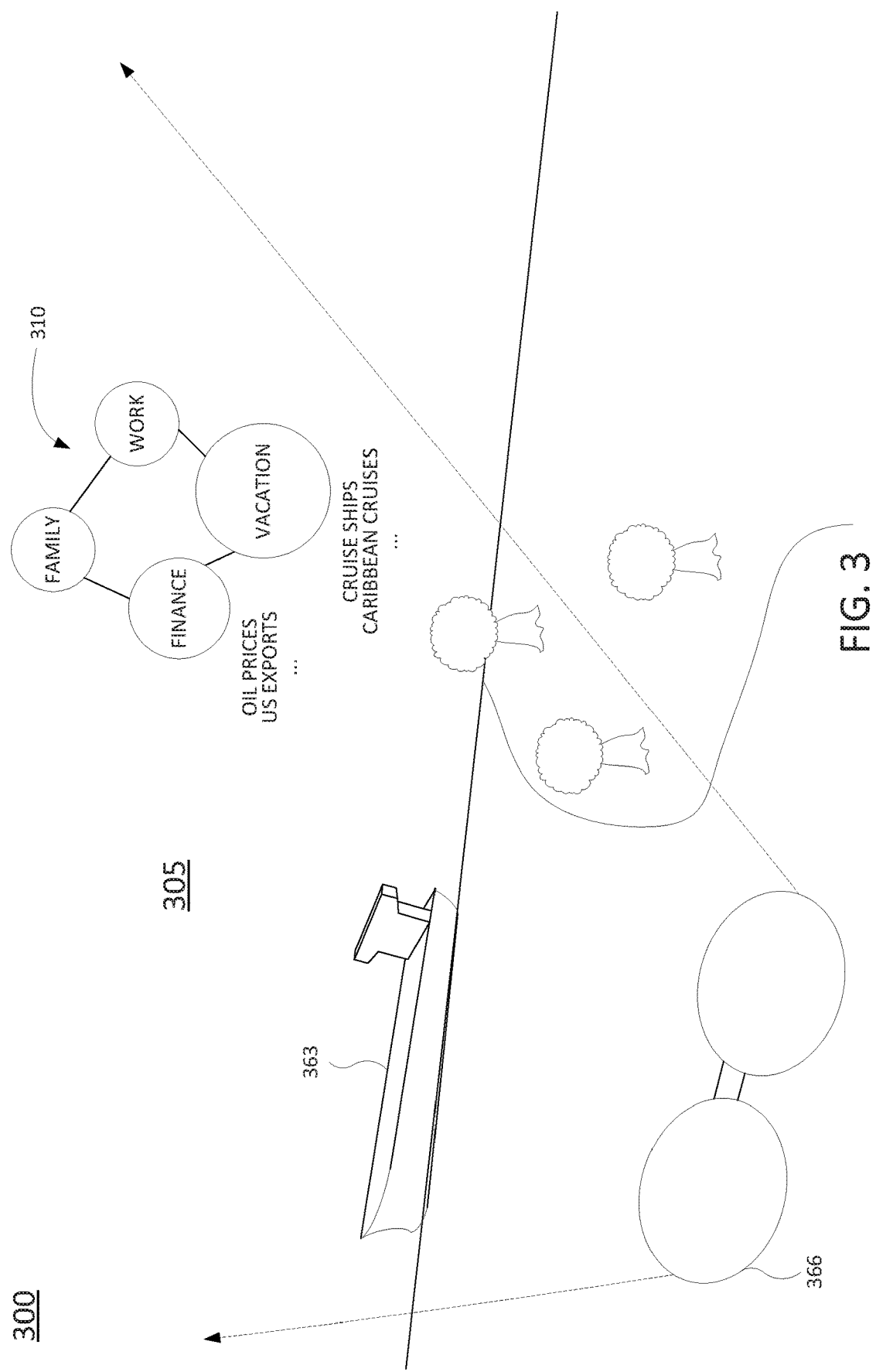
FIG. 3 illustrates an example display portion of a user interface for presenting automated search terms, in accordance with the present disclosure.

FIG. 3 illustrates an example display portion of a user interface 300 for presenting automated search terms. The display portion of user interface 300 may comprise, for example, a projection via a wearable device 366, e.g., smart glasses. In one example, the automated search terms may be proactively pushed into a field of vision of the user. In another example, the automated search terms may be presented upon a selection by the user of an option to present the automated search terms. In the example of FIG. 3 a user is viewing a scene 305 through wearable device 366. In addition, as illustrated in FIG. 3, there is a ship 363 in the field of view (e.g., a billboard, a page on a magazine, an advertising poster, and so on) that may be captured via wearable device 366. The ship 363, or a captured image of the scene 305, may comprise an input to the process for providing automated search terms via context filtering (e.g., as described in connection with the example of FIG. 2). The process may provide automated search terms relating to a plurality of active context filters of a user of wearable device 366. In this case, there may be four active context filters for the active themes of "family," "work," "finance," and "vacation." In the present example, the automated search terms associated with these respective themes may be presented via an options wheel 310, which may be presented via a display of the wearable device 366. In one example, the options wheel 310 may be projected such that the options wheel 310 appears to overlay a portion of the scene 305 within the field of view of the user via wearable device 366.

In one example, the user may manipulate the options wheel 310 to view different automated search terms that are generated in connection with the respective active themes. For instance, a user may "turn" the options wheel 310 via a hand gesture that may be captured via the wearable device 366, via a voice command, or via another input, e.g., a physical knob situated on the frame of the glasses. As the options wheel 310 turns, different themes and the associated automated search terms may be made more prominent, e.g., larger, bolder, colored coded, and so on. For instance, in the present example, it can be seen that the theme of "vacation" is made more prominent and the automated search terms associated therewith are visible. The theme of "finance" and associated automated search terms are also visible in the present example. However, as the options wheel 310 may be rotated clockwise, the options for "finance" may fade from view and the options for "work" may be brought into view.

In one example, eye movements of the user may direct selections or paths of search via the options wheel 310. For instance, winking of one eye could indicate a selection of an automated search term. In addition, winking could select a subsequent link that may be displayed as a result of a submission of the automated search term to a web browser. In one example, a selection of a link may also result in the user interface 300 prompting for a selection of how the user wants the information transferred (e.g., displayed, sent to email, played on nearby devices, etc.). In one example, squinting could inquire for more details, e.g., pull up more automated search terms for a given theme and push other themes to the background, bring an extended preview of a resulting link to the foreground, and so forth. Similarly, a slight shake of the head could close the options wheel 310. It should be noted that in one example, the options wheel 310 may be automatically presented via the user interface 300. However, in another example, the options wheel 310 may be presented when the user provides an input to call up the options wheel 310.

Figure 4:
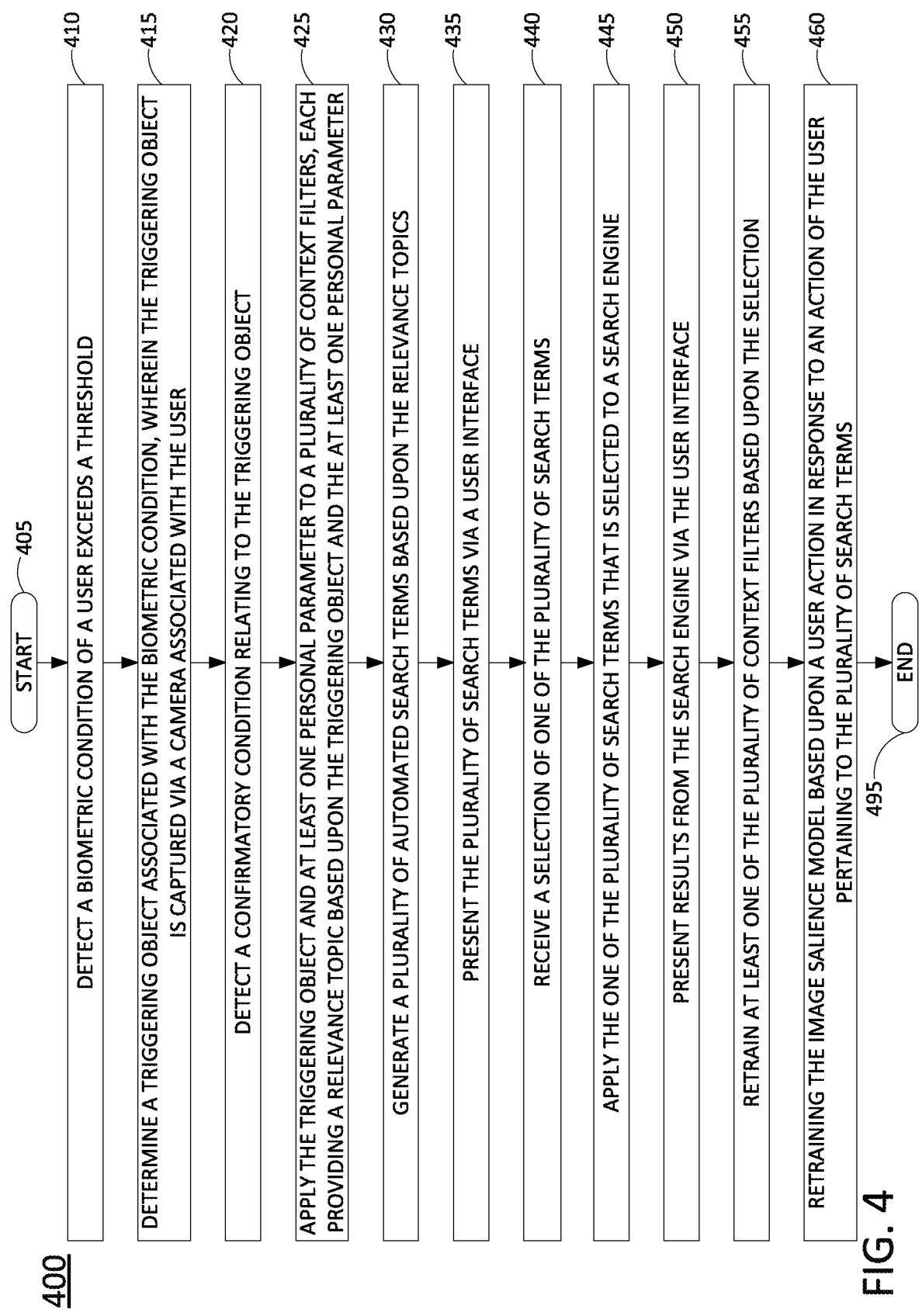
FIG. 4 illustrates an example flowchart of a method for providing automated search terms via context filtering, in accordance with the present disclosure.

FIG. 4 illustrates a flowchart of an example method 400 for providing automated search terms via context filtering, in accordance with the present disclosure. In one example, steps, functions and/or operations of the method 400 may be performed by a device as illustrated in FIG. 1, e.g., application server 145, server(s) 175, endpoint devices 165 and/or 166, or any one or more components thereof, such as a processing system, a processing system in conjunction with biometric and/or environmental sensors, and so forth. Alternatively, or in addition, the steps, functions and/or operations of the method 400 may be performed by a processing system collectively comprising a plurality of devices as illustrated in FIG. 1, such as application server 145, server(s) 175, endpoint devices 165 and/or 166, and so forth. In one example, the steps, functions, or operations of method 400 may be performed by a computing device or system 500, and/or a processing system 502 as described in connection with FIG. 5 below. For instance, the computing device 500 may represent at least a portion of a server, an application server, an endpoint device, and so forth, in accordance with the present disclosure. For illustrative purposes, the method 400 is described in greater detail below in connection with an example performed by a processing system, such as processing system 502. The method 400 begins in step 405 and proceeds to step 410.

At step 410, the processing system detects that a biometric condition of a user exceeds a threshold. For instance, the processing system may have one or more sensor devices integrated therewith, or may be in communication with one or more sensor devices, such as an acoustic sensor, an outward facing camera (e.g., facing in the direction of a user's gaze), an inward facing camera (e.g., directed at the user's eyes and/or the user's face), a heart rate monitor, a blood pressure monitor, a temperature sensor, a GPS unit, an ECG device, an EEG unit, a DOT scanning unit, a pedometer, a GSR device, a haptic sensor or haptic feedback device, and so forth. Through such devices, the processing system may measure various biometric conditions of a user, and detect that one or more threshold(s) are exceeded with regard to: a heart rate, a blood pressure, a breathing rate, a blood oxygen concentration, a facial expression, a pupil dilation, a voice pitch, a voice tone, an activity level, a skin conductance, a body temperature, an electrocardiogram pattern, a EEG scan pattern, a DOT scan pattern, and so on.

At step 415, the processing system determines a potential triggering object associated with the biometric condition, where the triggering object is captured, e.g., via a camera associated with the user. In one example, the camera is integrated with a wearable device. In one example, step 415 may include applying an image salience model to an image (or series of images) captured via the camera. In one example, step 415 may also include applying an object recognition algorithm after applying an image salience model, e.g., if the image salience model does not detect the actual type of object, but only the spatial region(s) of an image or series of frame(s) that is most of interest. In one example, the image salience model may comprise a machine learning model that is trained in accordance any one or more of the machine learning algorithms described above. The image salience model may comprise a general model, or may be personalized to the user. For instance, the image salience model may be trained and retrained, e.g., as per step 460 discussed below.

At step 420, the processing system may detect a confirmatory condition relating to the triggering object. The confirmatory condition may comprise at least one of: a verbal reference to the triggering object, a text reference to the triggering object, a gesture, or a maintenance of the triggering object within a field of view of the camera.

At step 425, the processing system applies the triggering object and at least one personal parameter to a plurality of context filters, where each of the plurality of context filters provides a relevance topic based upon the triggering object and the at least one personal parameter. In one example, the applying is performed in response to the detecting of the confirmatory condition at step 415. Notably, by utilizing a confirmatory condition, the amount of data processing may be reduced and limited to situations where an object is of particular interest to the user, rather than those of only passing interest. The at least one personal parameter may comprise at least one of: calendar information, location information (e.g., current and/or historical location information), a communication history, a search history, credit card transaction information, user preference information, or auditory information from the vicinity of the user (e.g., including words spoken by the user or others nearby the user, music, recognizable sounds, such as a honking horn, breaking waves, road traffic, and so forth).

The plurality of context filters may comprise machine learning models to determine relevance topics based upon the triggering object and the at least one personal parameter. In one example, the machine learning models are trained with training data associated with the user, a plurality of other users, or both. In one example, each of the machine learning models is specific to a different theme of a plurality of themes, wherein each of the plurality of themes is associated with a respective set of (possible) topics. The plurality of themes may include, for example, a family theme, a work theme, a sports theme, a relationship theme, a food theme, a shopping theme, or an entertainment theme.

In one example, a number of the plurality of context filters is configured to be limited to a set number of the context filters. For instance, in one example, the processing system may pre-select the plurality of context filters to be active context filters, e.g., based upon at least one of: a selection by the user, a time, a location, and so forth. For example, the processing system may account for a history of selections by the user of automated search terms generated via the plurality of context filters, as well as selections and/or non-selection of search terms generated via other context filters at different times of day, days of week, different locations, etc.

At step 430, the processing system generates a plurality of automated search terms based upon the relevance topics that are determined from the plurality of context filters. In one example, the generating of the plurality of automated search terms comprises, for each relevance topic, selecting auto-complete or auto-suggest terms associated with the relevance topic and the triggering object from a database. In one example, auto-complete or auto-suggest results relating to the triggering object may provide a list of resulting links which may be scored for relevance to the relevance theme and/or the topic associated with the respective context filter, and the top "n" results returned. The automated search terms may be further generated in view of the user's preferences, search history, purchase history, etc. For instance, previous search terms or previous selections made by the user relating to the theme, topic, and/or triggering object may be stored such that the previous search terms can be positively weighted as possible suggestions. Similarly, in another example, automated search terms are generated from search terms and/or link selections made by contacts of the user in similar contexts (e.g., when similar perspectives/themes are active for the other users), or from search terms and/or link selections of other users who have similar profiles to the user, etc.

At step 435, the processing system presents the plurality of automated search terms via a user interface. For example, the plurality of automated search terms may be presented via a display or a speaker of the wearable device. For instance, in one example, the plurality of automated search terms may be presented as an options wheel via a user interface presented via the display, or as an audible output via a speaker or headphones.

At step 440, the processing system may receive a selection of one of the plurality of automated search terms. For instance, in the case of a wearable device, such as smart glasses, the selection may be made via one of: a hand gesture, an eye gesture, a voice command, an input via a physical button or dial and so on. At step 445, the processing system may apply one of the plurality of automated search terms that is selected to a search engine. In addition, at step 450, the processing system may present results from the search engine in response to the selected search term or terms via the user interface.

At step 455, the processing system may retrain at least one of the plurality of context filters based upon the selection. For example, the context filters may be trained with training data associated with the user, a plurality of other users, or both. In one example, the context filters may be initialized based upon generic user profiles and then retrained and evolved to match the behaviors and preferences of the user. For instance, a user may have an active theme of "finance" and a triggering object of a "ship." The relevant topics determined for the theme of "finance," and the triggering object of "ship" may include: "oil prices," "U.S. import statistics," and so forth, with the "oil prices" topic being scored the highest. The processing system may present automated search terms relating to both topics. In addition, in one example, the automated search terms for "oil prices" may be more prominent based upon the personal parameters of the user. However, the user may select the search term(s), or a number of links relating to the search terms for "U.S. import statistics" which may reveal an emerging interest or preference for this particular topic. As such, the "finance" context filter may be retrained to account for these particular selections of the user.

At step 460, the processing system may retrain the image salience model based upon a user action pertaining to the plurality of automated search terms. For instance, in retraining the image salience model, the processing system may account for a selection made by the user, a lack of any selection made by a user, an ignoring menu of options by the user, and so forth. At step 495, the method 400 ends.

It should be noted that the method 400 may be expanded to include additional steps or may be modified to include additional operations with respect to the steps outlined above. For example, the method 400 may be repeated through various cycles of detecting biometric conditions, determining triggering object, and generating automated search terms. In addition, the method 400 may include cycles of retraining image salience model(s), context filter (s), auto-complete and/or auto-suggest models, models for selecting active context filters, and so forth. Thus, these and other modifications are all contemplated within the scope of the present disclosure.

In addition, although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted either on the device executing the method 400, or to another device, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for providing automated search terms via context filtering, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 506 may also include antenna elements, transceivers, power units, and so forth. Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the above method 400, or the entire method 400 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one example, instructions and data for the present module or process 505 for providing automated search terms via context filtering (e.g., a software program comprising computer-executable instructions) can be loaded into memory 504 and executed by hardware processor element 502 to implement the steps, functions, or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for providing automated search terms via context filtering (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
a processing system including at least one processor;
a computer-readable medium storing instructions which, when executed by the processing system, cause the processing system to perform operations, the operations comprising:
detecting a biometric condition of a user exceeding a threshold;
determining a triggering object associated with the biometric condition, wherein the triggering object is captured via a camera;
applying the triggering object and at least one personal parameter to a plurality of context filters, wherein each of the plurality of context filters provides a relevance topic based upon the triggering object and the at least one personal parameter;
generating a plurality of search terms based upon the relevance topics that are determined from the plurality of context filters; and
presenting the plurality of search terms via a user interface.

2. The device of claim 1, wherein the operations further comprise:
receiving a selection of one of the plurality of search terms;
applying the one of the plurality of search terms that is selected to a search engine; and
presenting results from the search engine in response to the one of the plurality of search terms via the user interface.

3. The device of claim 2, wherein the operations further comprise:
retraining at least one of the plurality of context filters based upon the selection.

4. The device of claim 1, wherein the operations further comprise:
detecting a confirmatory condition relating to the triggering object, wherein the applying is performed in response to the detecting of the confirmatory condition.

5. The device of claim 4, wherein the confirmatory condition comprises at least one of:
a verbal reference to the triggering object;
a text reference to the triggering object;
a gesture; or
a maintenance of the triggering object within a field of view.

6. The device of claim 1, wherein the biometric condition of the user comprises at least one of:
a heart rate;
a blood pressure;
a breathing rate;
a blood oxygen concentration;
a facial expression;
a pupil dilation;
a voice pitch;
a voice tone;
an activity level;
a skin conductance;
a body temperature;
an electrocardiogram pattern;
an electroencephalography scan pattern; or
a diffuse optical tomography scan pattern.

7. The device of claim 1, wherein the biometric condition of the user is determined via at least one of:
a heart rate monitor;
a blood pressure monitor;
an electrocardiogram device;
a microphone;
a second camera;
a galvanic skin response device;
an electroencephalography device;
an event-related potential measurement device; or
a diffuse optical tomography scanning device.

8. The device of claim 1, wherein the at least one personal parameter comprises at least one of:
calendar information;
location information;
a communication history;

a search history;

a television viewing history;

credit card transaction information;

user preference information; or auditory information from a vicinity of the user.

9. The device of claim 1, wherein the determining the triggering object comprises:

applying an image salience model to an image captured via the camera.

10. The device of claim 9, wherein the operations further comprise:

retraining the image salience model based upon a user action pertaining to the plurality of search terms.

11. The device of claim 1, wherein the plurality of context filters comprises machine learning models to determine the relevance topics based upon the triggering object and the at least one personal parameter.

12. The device of claim 11, wherein the machine learning models are trained with training data associated with at least one of:

the user; or a plurality of other users.

13. The device of claim 11, wherein each of the machine learning models is specific to a different theme of a plurality of themes.

14. The device of claim 13, wherein the plurality of themes includes:

a family theme;

a work theme;

a sports theme;

a relationship theme;

a food theme;

a shopping theme; or an entertainment theme.

15. The device of claim 1, wherein a subset of the plurality of context filters is configured to be a limited set of context filters, wherein the operations further comprise:

selecting the limited set of context filters to be active context filters.

16. The device of claim 15, wherein the limited set of context filters is selected to be the active context filters based upon at least one of:

a selection by the user;

a time; or a location.

17. The device of claim 1, wherein the generating the plurality of search terms comprises, for each relevance topic, selecting auto-complete or auto-suggest terms associated with the relevance topic and the triggering object from a database.

18. The device of claim 1, wherein the camera is integrated with a wearable device, wherein the plurality of search terms is presented via the user interface comprising a display of the wearable device.

19. A non-transitory computer-readable medium storing instructions which, when executed by a processing system comprising at least one processor, cause the processing system to perform operations, the operations comprising:

detecting a biometric condition of a user exceeding a threshold;

determining a triggering object associated with the biometric condition, wherein the triggering object is captured via a camera;

applying the triggering object and at least one personal parameter to a plurality of context filters, wherein each of the plurality of context filters provides a relevance topic based upon the triggering object and the at least one personal parameter;

generating a plurality of search terms based upon the relevance topics that are determined from the plurality of context filters; and presenting the plurality of search terms via a user interface.

20. A method, comprising:

detecting, by a processing system including at least one processor, a biometric condition of a user exceeding a threshold;

determining, by the processing system, a triggering object associated with the biometric condition, wherein the triggering object is captured via a camera;

applying, by the processing system, the triggering object and at least one personal parameter to a plurality of context filters, wherein each of the plurality of context filters provides a relevance topic based upon the triggering object and the at least one personal parameter;

generating, by the processing system, a plurality of search terms based upon the relevance topics that are determined from the plurality of context filters; and presenting, by the processing system, the plurality of search terms via a user interface.

* * * * *